United States Patent
White

(10) Patent No.: US 6,918,913 B2
(45) Date of Patent: Jul. 19, 2005

(54) TOOL BIT DRIVE SHAFT CONNECTION AND METHOD

(75) Inventor: Patrick M. White, West Chester, PA (US)

(73) Assignee: Precimed S.A., Orvin (CH)

( * ) Notice: Subject to any disclaimer, the term of this patent is extended or adjusted under 35 U.S.C. 154(b) by 252 days.

(21) Appl. No.: 10/055,806

(22) Filed: Jan. 22, 2002

(65) Prior Publication Data

US 2002/0128658 A1 Sep. 12, 2002

Related U.S. Application Data

(63) Continuation-in-part of application No. 10/043,423, filed on Jan. 10, 2002.
(60) Provisional application No. 60/262,362, filed on Jan. 19, 2001, and provisional application No. 60/338,718, filed on Nov. 6, 2001.

(51) Int. Cl.[7] .............................................. A61B 17/16
(52) U.S. Cl. ........................................ 606/80; 403/381
(58) Field of Search ................................ 403/381, 300, 403/309, 365, 367, 371; 606/79, 80, 81, 167–173, 180

(56) References Cited

U.S. PATENT DOCUMENTS

| | | | | |
|---|---|---|---|---|
| 4,706,659 A | * | 11/1987 | Matthews et al. | 606/80 |
| 5,499,984 A | * | 3/1996 | Steiner et al. | 606/80 |
| 5,549,613 A | * | 8/1996 | Goble et al. | 606/80 |
| 6,053,922 A | * | 4/2000 | Krause et al. | 606/80 |

* cited by examiner

Primary Examiner—David O. Reip
(74) Attorney, Agent, or Firm—Bugnion S.A.; John Moetteli

(57) ABSTRACT

A surgical instrument is described that has a distinctive torque-transmitting coupling assembly. A tubular member made of super-elastic alloy has a driven end and a driving end with an integral tongue member, which defines a passageway that extends along a first axis. A fitting member defines a shape presenting a first mating interface surface. A tool-bit member has a second axis and presents a second mating interface surface adapted for receptive complemental facing with the first mating interface surface, including a recess formed in the second mating interface surface. Relative motion activates the super-elastic alloy of the tongue, which detentively snaps into the recess to align the first and second axes with one another. A flexible surgical reamer is similarly disclosed, where the fitting has an aperture opening onto the first mating interface surface and the tongue projects through the aperture.

17 Claims, 6 Drawing Sheets

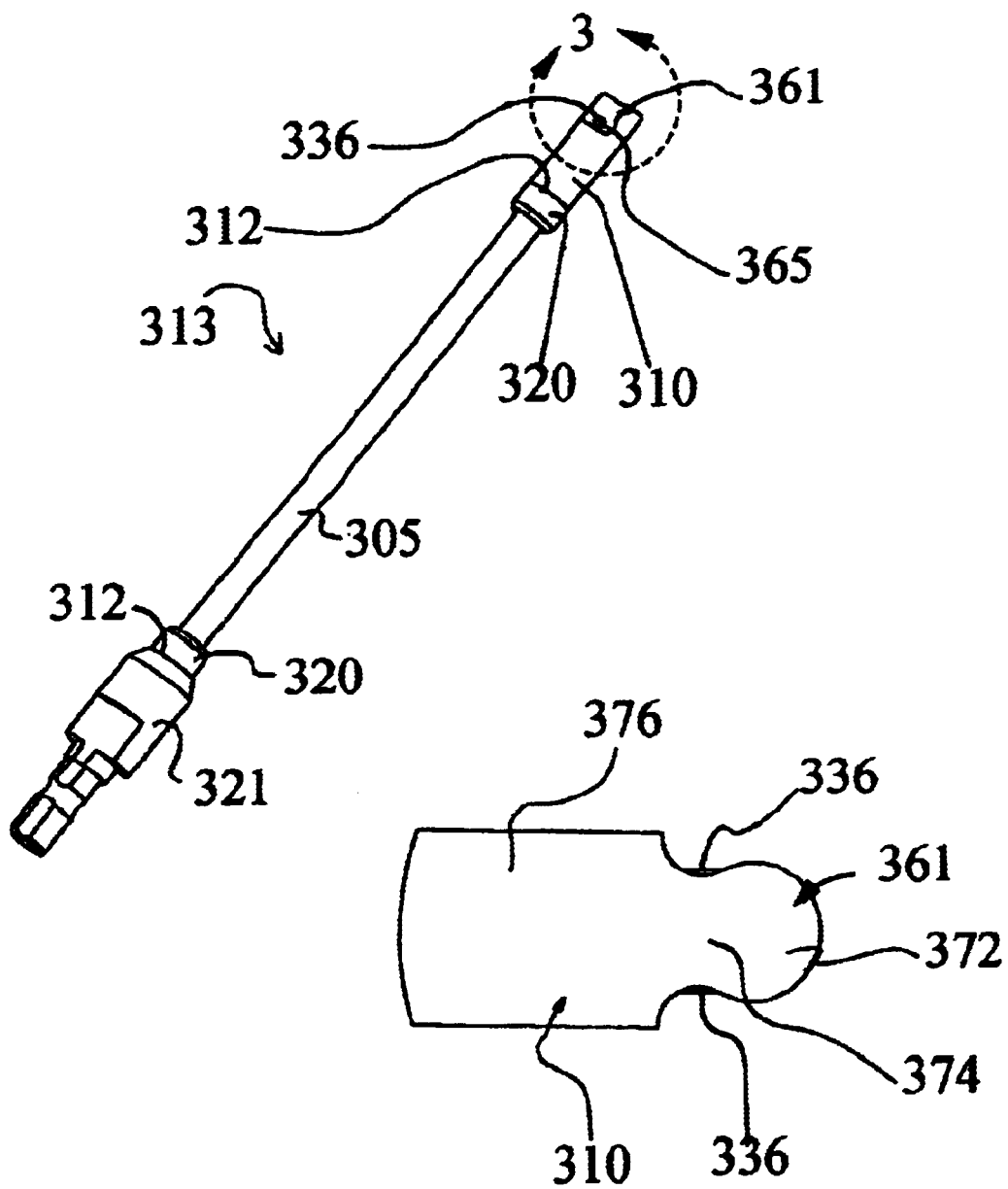

TOOL BIT DRIVE SHAFT CONNECTION AND METHOD

RELATED APPLICATIONS

This application is a continuation-in-part of Ser. No. 10/043,423, filed on Jan. 10, 2002 and entitled "Drive Shaft Coupling", which in turn claims priority from the provisional application Ser. No. 60/262,362 of that title filed on Jan. 19, 2001. The present application also claims priority from provisional application Ser. No. 60/338,718 entitled "Tool Bit Drive Shaft Connection and Method" filed on Nov. 6, 2001, the entire disclosure of which is expressly incorporated by reference herein and relied-upon, as is Ser. No. 10/059,232, filed concurrently herewith and entitled "Torque-Transmitting Coupling".

FIELD OF THE INVENTION

This invention relates generally to the connection of tool bits to superelastic flexible tubular drive shafts with particular emphasis on quick long-life connect/disconnect apparatus for mounting surgical tool bits on superelastically flexible, preferably nickel-titanium alloy, tubular drive shafts in surgical environments.

BACKGROUND OF THE INVENTION AND DESCRIPTION OF THE PRIOR ART

Connector devices for rotatable tubular drive members and tool bits, particularly for surgical applications, are known with one such connector being disclosed in U.S. Pat. No. 5,203,595.

The '595 apparatus is understood to have enjoyed a modest degree of commercial success. However, there are shortcomings in the '595 apparatus. Specifically, in a surgical environment, sterility of the equipment is an absolute requirement. Assuring a sterile environment means that all equipment introduced into the patient's body or in proximity to the patient must be sterile. To assure sterile conditions, such equipment is autoclaved after each surgical procedure.

Autoclaving and the high temperatures and humidities associated therewith results in the flexible material, namely polypropylene or other suitable material as recited at column 4, line 53 of '595, becoming brittle and failure prone long before the coupling device has otherwise worn out.

Additionally, the wedging action to which the thermoplastic is subjected in '595 contributes to rapid deterioration of the flexible polypropylene material. Moreover, the sliding engagement of the major mating members of '595 results in continuous wearing of the thermoplastic material.

Accordingly, the need remains for highly reliable, reusable connectors for tubular drive apparatus in a surgical environment. Increasing the useful life of the connector is highly desirable in order to reduce the skyrocketing costs associated with surgery.

SUMMARY OF THE INVENTION

A torque-transmitting coupling assembly is described, including a tubular member, a fitting member and a tool-bit member. In one aspect a surgical instrument is disclosed, while in another aspect a surgical reamer is disclosed, respectively, having one or more preferred embodiments of the assembly. The tubular member of the assembly is made of super-elastic alloy and defines a passageway extending along a first axis. The fitting member defines a shape presenting a first mating interface surface. The tool-bit member has a second axis and presenting a second mating interface surface adapted for receptive complemental facing with the first mating interface surface. Relative motion between the fitting and tool-bit slides the first and second mating interface surfaces sideways into juxtaposition, with the first and second axes aligned with one another. In a preferred embodiment, the assembly has a tongue member made of super-elastic alloy, the relative motion activating the super-elastic alloy of the tongue, allowing the mating interface surfaces to be held in juxtaposition with one another. It is further preferred that a recess be formed in the tool-bit, wherein the tongue detentively snaps into the recess to align the first and second axes with one another. In another preferred embodiment of the assembly, the fitting has an aperture opening onto the first mating interface surface, with the tongue projecting through the aperture. In yet another preferred embodiment of the assembly, the tongue is an integral part of the tubular member. In still another preferred embodiment of the assembly, the tongue extends axially from an end of the fitting member and within the tool-bit. The fitting member may have a male part extending axially therefrom and defining a jigsaw shape that presents the first mating interface surface, while the tool-bit defines a female jigsaw shape presenting the second mating interface surface and including a recess formed therein. The first and second mating interface surfaces of the assembly are preferably correspondingly curved. A radially flexing collet preferably connects the fitting to the tubular member.

In one aspect of the invention, a surgical instrument having a torque-transmitting coupling assembly is disclosed. The instrument has a tubular member made of super-elastic alloy with a driven and a driving end having an integral tongue member, defining a passageway extending along a first axis. A fitting member defines a shape presenting a first mating interface surface. A tool-bit member has a second axis and presents a second mating interface surface adapted for receptive complemental facing with the first mating interface surface, including a recess formed in the second mating interface surface. Relative motion activates the super-elastic alloy of the tongue, which detentively snaps into the recess to align the first and second axes with one another. Preferably, the fitting has an aperture opening onto the first mating interface surface and the tongue projects through the aperture. The tongue may extend axially from an end of the fitting member and within the tool-bit. In a preferred embodiment, the fitting member has a male part extending axially therefrom that defines a jig-saw shape presenting the first mating interface surface, while the tool-bit defines a female jigsaw shape presenting the second mating interface surface. In another preferred embodiment the passageway extending from an axially open center of the tubular member and opening onto the first mating interface surface, wherein the recess aligns concentrically with the passageway when the tool bit and the tubular member are slid sideways relative to one another so that the first and second mating interface surfaces are juxtaposed.

In another aspect of the invention, a flexible surgical reamer having a torque-transmitting coupling assembly is described. The reamer has a tubular member made of super-elastic alloy with a driven end and a driving end having an integral tongue member, defining a passageway extending along a first axis. A fitting member defines a shape presenting a first mating interface surface including an aperture opening onto the first mating interface surface, with the tongue projecting through the aperture. A tool-bit member has a second axis and presents a second mating interface surface adapted for receptive complemental facing with the first mating interface surface, including a recess formed in the second mating interface surface. Relative motion activates the super-elastic alloy of the tongue, which detentively snaps into the recess to align the first and second axes with one another. In a preferred embodiment, reamer is disclosed having another torque-transmitting coupling assembly, which includes a drive fitting and a radially flexing collet that connects the driven end to the drive fitting.

Other objects and advantages that address the above-stated needs will become apparent to those skilled in the art, upon reviewing the Figures of the Drawings, in conjunction with the Detailed Description set forth further below, wherein references to numerals corresponds to like references in the Drawings.

BRIEF DESCRIPTION OF THE DRAWINGS

FIG. 2 is a perspective view of the tubular drive shaft assembly of FIG. 1 in an assembled condition, with no tool bit connected to the drive shaft assembly.

FIG. 3 is a side view of a male drive fitting portion of the tubular drive shaft assembly illustrated in FIGS. 1 and 2, as indicated by dotted circle 3 in FIG. 2.

DESCRIPTION OF THE PREFERRED AND ALTERNATE EMBODIMENTS

AND BEST MODE PRESENTLY KNOWN FOR PRACTICE OF THE INVENTION

This invention is premised on the inventor's discovery that superelastic alloys, particularly superelastic nickel-titanium alloys, may be used effectively to create long-life quick disconnect detent action connecting devices in which the required elastic or snap-action characteristic of the detent is induced by creating internal stresses within the alloy member, resulting in material phase change and superelasticity, where the stresses are induced by flexure of the superelastic member by a second member as and when the two members are assembled together in the desired connection configuration.

Figure 1:
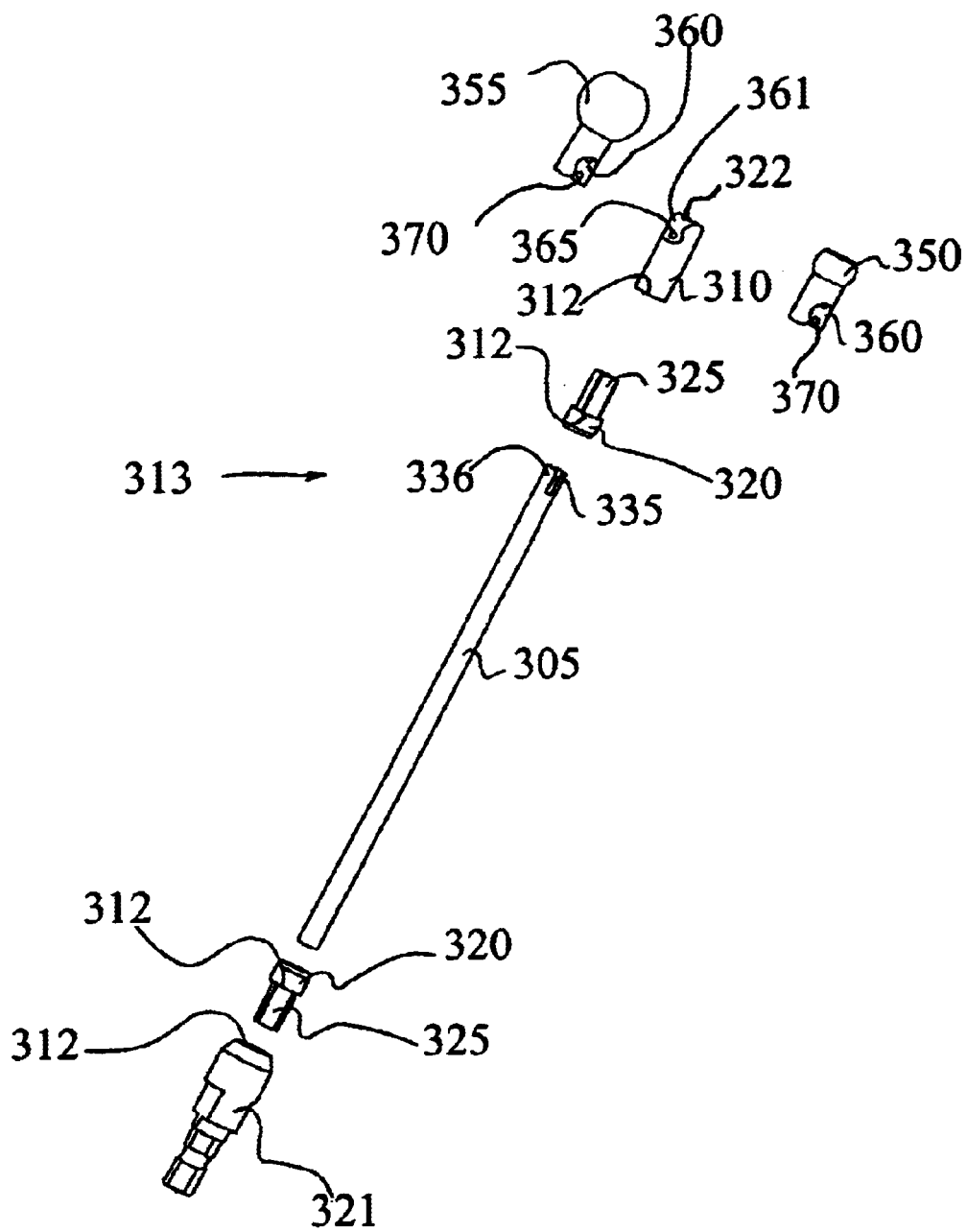
FIG. 1 is an exploded perspective view of a long-life tubular drive shaft assembly for use with a quick connect tool bit, all in accordance with the preferred embodiment of the apparatus aspects of the invention, with two tool bits having different bit sizes being shown and each being ready to be mounted on the drive shaft assembly.

Referring to the drawings in general and to FIG. 1 in particular, which is an exploded view of a tubular drive shaft assembly for use with a quick connect tool bit in accordance with the preferred embodiment of the apparatus aspects of the invention, the drive shaft assembly is designated generally 313 and includes an axially elongated hollow tubular shaft 305 preferably fabricated from suitable superelastic nickel-titanium alloy preferably of the type generally identified by the trademark Nitinol. Tubular shaft 305 at one end thereof has a relief groove or slot 335 formed therein serving to define two preferably axially extending tongues 336 which are superelastically flexible in the radial direction upon application of suitable stress, as a result of the Nitinol alloy stress-induced phase change and resulting superelasticity characteristic.

Drive shaft assembly 313 further includes an annularly configured connector 320 which includes an axially elongated collet portion 325 extending from an annular base portion of connector 320. Collet portion 325 is preferably fabricated from, e.g., stainless steel, such that collet portion 325 may radially bend or flex upon application of radially inward force thereto. Connector 320 with its annular base portion is sized to receive shaft 305 in reasonably tight but sliding engagement.

During operation, tubular shaft 305 is rotated in order to rotatably drive a surgical fitting to which shaft 305 is connected in part via connector 320, as described in greater detail below.

Located at an end of tubular shaft 305 opposite that at which tongues 336 are formed is a second connector 320 including a radially flexing collet portion 325 and an annular base portion, with such connector receiving a remaining end of tubular shaft 305 therewith.

A power drive fitting 321 is provided for transmitting torque to shaft 305 from an external source; power drive fitting 321 grips tubular shaft 305 as a result of radially outward superelastic phase change deformation of shaft 305 against collet portion 325, in reaction to radially inward forces applied to tubular shaft 305 by collet 325. Collet portion 325 extends from a base portion of flexible connector 320 which fits together with power drive fitting 321, with these components preferably being welded or otherwise bonded together as indicated by weld line(s) 312 in FIGS. 1, 2 and 4.

Still referring to FIG. 1, a tool drive fitting for transmitting torque from shaft 305 to a driven tool bit, such as either of the small and large tool bits respectively designated 350, 355 in FIG. 1, is designated generally 310. In this regard, provision of a kit or other collection of a larger plurality of tool bits, of differing sizes and/or as replenishments one for another, is envisioned as an aspect of this invention. Tool drive fitting 310 is preferably generally cylindrical in form and in any event desirably has a continuously curved circumferential outer surface which may, as an alternative, be of frusto-conical or other curved configuration. Tool drive fitting 310 has an open center for axial passage therethrough of a guide wire along which drive shaft assembly 313 travels, using the wire as a guide during a surgical procedure. The hollow interior of tool drive fitting 310 additionally accommodates the preferably radially flexing collet portion 325 of connector 320. An opening or canulation 322 is provided preferably along the axis of tool drive fitting 310 for passage of the surgical guide wire out of tool drive fitting 310.

Referring to FIGS. 1 and 3, a mating tip portion of tool drive fitting 310 is referred to as a male tool bit interface 361 and preferably includes a bulbous portion 372 connecting to a main, preferably cylindrically configured, body portion 376 of tool drive fitting 310 via a neck portion 374, which is of smaller cross-section than bulbous portion 372 as readily apparent from FIG. 3. Cylindrical body portion of tool drive fitting 310 is designated 376 in FIG. 3.

Exterior surfaces of bulbous portion 372 and neck portion 374 are curved and connect together in a continuous fashion so that bulbous portion 372 and neck portion 374 preferably form a structure like that found in interlocking jigsaw puzzle pieces. Cylindrical body portion 376 is preferably of larger cross-section, as illustrated in FIG. 3, than is bulbous portion 372. The central passageway through tool drive fitting 310, for passage of the guide wire and for receipt of the radially flexing collet portion 325 of connector 320, is not illustrated in FIG. 3 to enhance drawing clarity.

Tool drive fitting 310 further includes at least one preferably radially facing aperture formed in neck portion 374 and providing communication between the curved, external surface of neck portion 374 and the central axially extending passageway within tool drive fitting 310. One such aperture, designated generally 365, is shown in FIGS. 1 and 2.

When the drive shaft assembly of FIGS. 1 and 2 is assembled, the end of shaft 305 at which radially reactively elastically deformable tongues 336 are located is inserted through connector 320 sufficiently far that the axial extremities of tongues 336 extend out of a distal end of connector 320, beyond the axial extremity of collet 325. Tool drive fitting 310 is then slid over collet portion 325 with the elastically flexing canulation of collet portion 325 pressing radially inwardly causing stresses in nickel-titanium alloy shaft 305, resulting in stress-produced phase-change induced superelasticity and resulting reactive force exerted radially outwardly by tube 305, retaining tool drive fitting 310 in position. Tubular shaft 305 is farther inserted until tongues 336 reach radially opening windows or apertures 365 at which the radially outward bias or superelastic spring action of tongues 336, resulting from the radially inward flexing of tongues 336 upon passage through fitting 310 and the consequent phase change and adoption of a superelastically deformable characteristic by the nickel-titanium alloy from which shaft 305 is fabricated, causes tongues 336 effectively to detent radially outwardly into windows or apertures 365 and protrude slightly therefrom in the radial direction as illustrated in FIG. 3.

Tool bits for use in accordance with the drive shaft assembly 313 have tool drive fitting 310 with male tool bit interface 361 configured as shown and described above respecting FIGS. 1, 2 and 3. Each tool bit 350, 355 includes a female tool bit interface surface 360 configured for complemental facing contact With exteriorly facing surfaces of bulbous portion 372 and neck portion 374 of tool drive fitting 310. Formed within each female tool bit interface surface 360 is a recess 370 providing a detenting receptacle for receiving one of radially reactively superelastically flexing tongues 336 when tool bit interface 360 is in complemental contact with external surfaces of neck portion 374 and bulbous portion 372 of tool drive fitting 310. When this occurs, resulting stress-induced superelastic radial bias of tongues 336 causes those tongues to engage respective apertures 370, thereby providing a detenting action retaining tool drive fitting 310 in mating contact and coupled connection with a selected tool bit 350 or 355.

Figure 4:
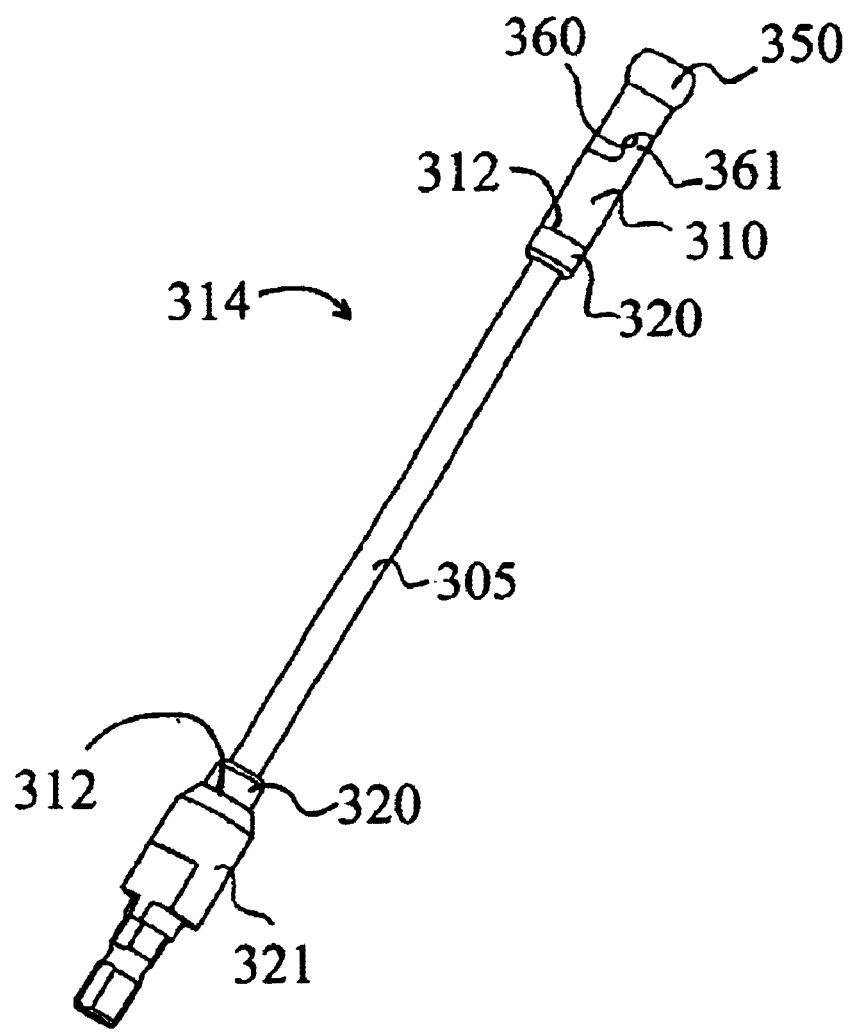
FIG. 4 is a perspective view of the drive shaft assembly of FIGS. 1 and 2 in an assembled condition with a tool bit connected to the drive shaft assembly.

Such mated, coupled configuration of a selected small tool bit 350 with drive shaft assembly 313 is illustrated in FIG. 4 where the assembly of drive shaft 313 and tool bit 350 is designated as a drive shaft and tool bit assembly 314.

Figure 5:
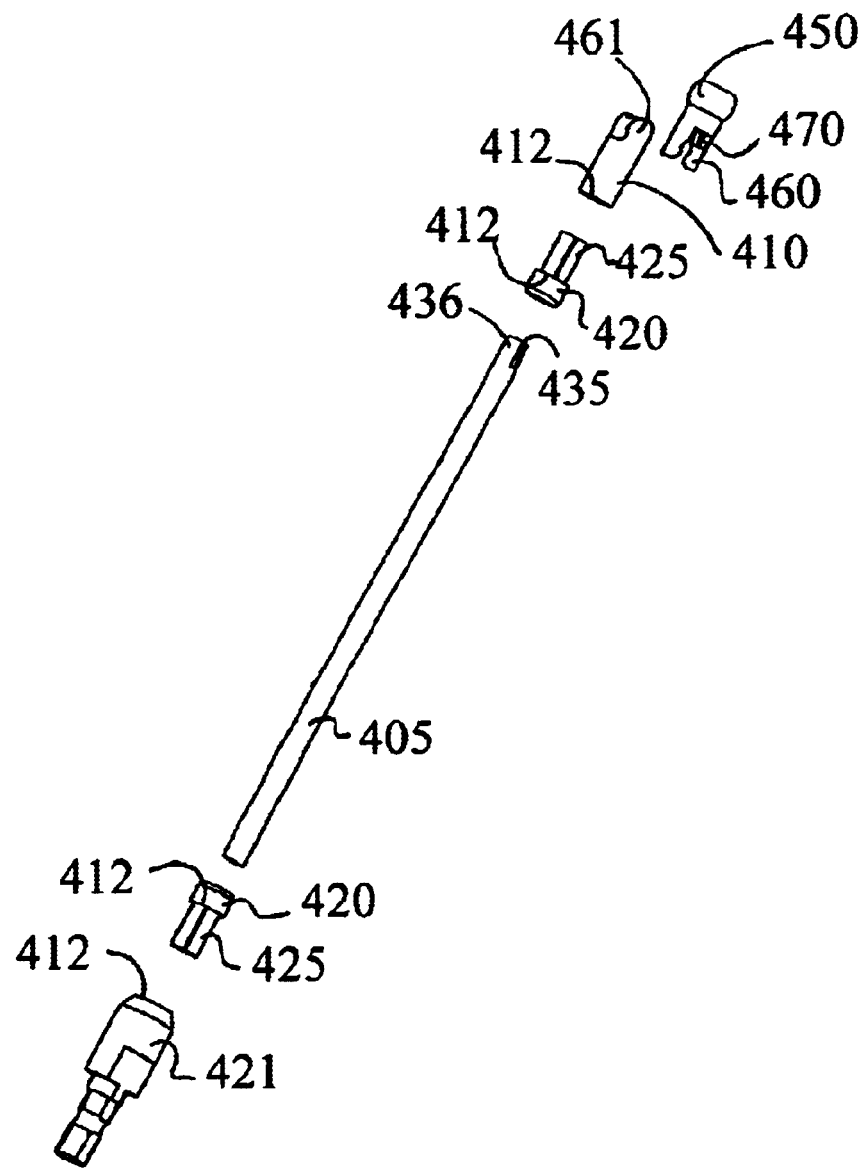
FIG. 5 is an exploded perspective view of a tubular drive shaft assembly for use with a quick connect tool bit in accordance with an alternate embodiment of the apparatus aspects of the invention, with a tool bit shown separate from but ready to be mounted on the drive shaft assembly.
Figure 6:
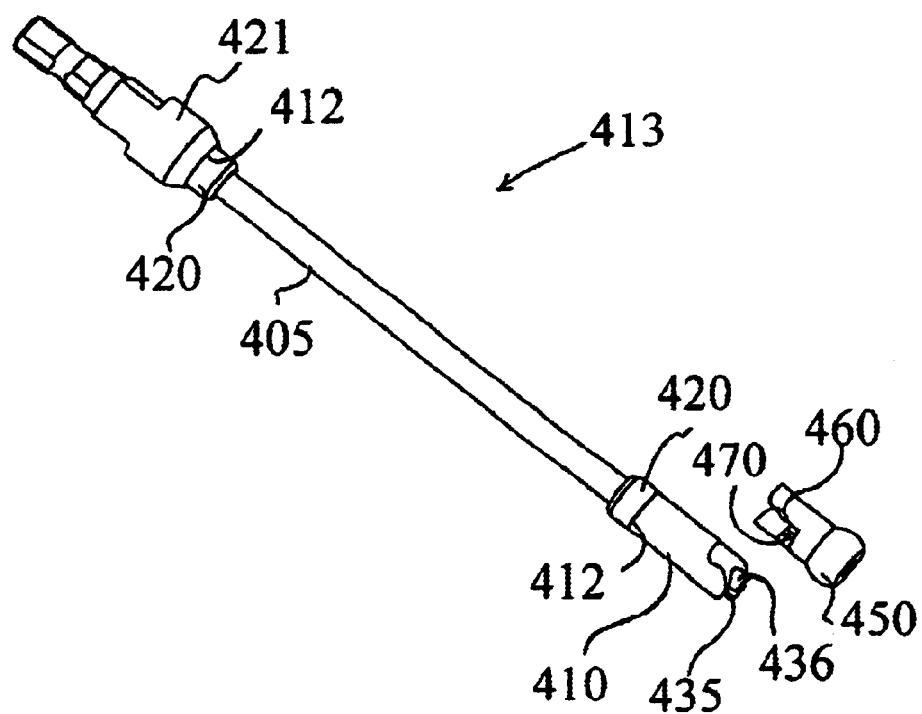
FIG. 6 is a perspective view of the tubular drive shaft assembly of FIG. 5 in an assembled condition, with a quick connect tool bit shown separate from but ready to be mounted on the drive shaft assembly.
Figure 7:
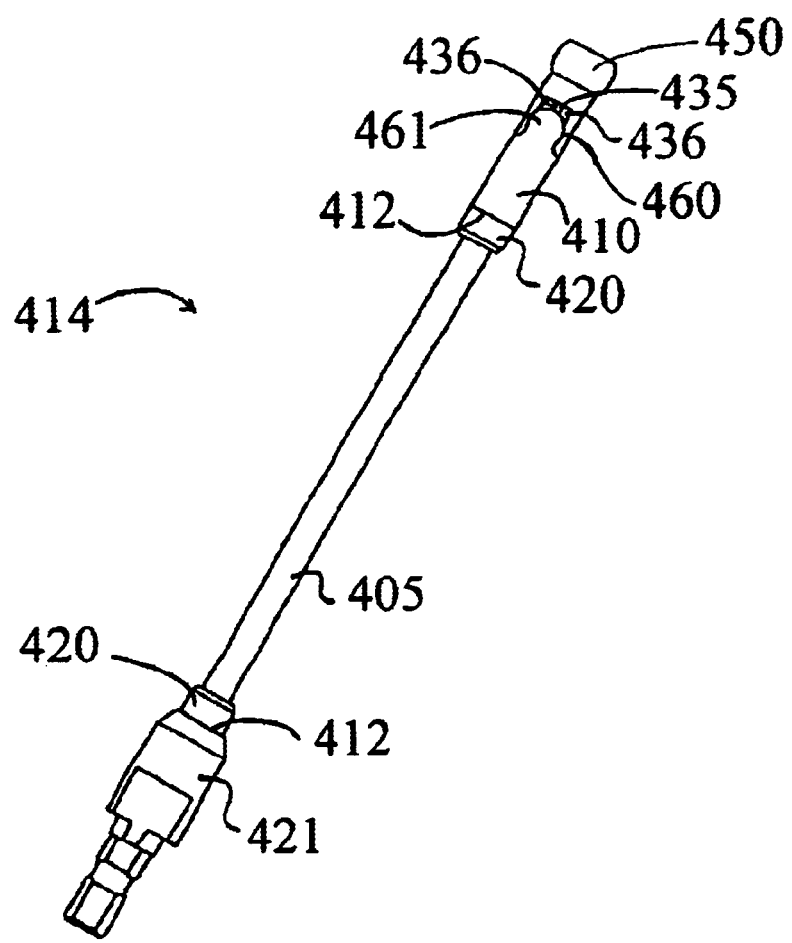
FIG. 7 is a perspective view of the tubular drive shaft of FIGS. 5 and 6 with a tool bit mounted on the drive shaft assembly.

FIGS. 5, 6 and 7 disclose an alternate embodiment of a tubular long-life drive shaft assembly in accordance with apparatus aspects of the invention. Referring specifically to FIG. 5, shaft 405 is analogous to shaft 305 illustrated in FIGS. 1, 2 and 4. Similarly, radially flexible connector 420 having a radially flexible collet portion 425 and a power drive fitting all are analogous to corresponding components numbered 320, 325 and 321 in FIGS. 1, 2 and 4.

Still referring to FIG. 5, shaft 405 preferably includes a relief groove or slit 435 thereby defining a pair of stress-induced radially superelastically flexible tongues 436 which preferably correspond generally to tongues 336 illustrated in FIGS. 1, 2 and 4.

Still referring to FIG. 5, a tool drive fitting 410 for transmitting torque from shaft 405 to a driven tool includes male tool bit interface which is preferably configured having an external surface preferably in the shape of a jigsaw puzzle piece configuration such as that defined by bulbous portion 372 and neck 374 in FIG. 3.

However, male tool bit interface 461 preferably does not include radially facing apertures or windows such as 365 illustrated in FIGS. 1 and 2. Instead, in the alternate embodiment illustrated in FIGS. 5 through 7, radially superelastically reactively flexing tongues 436 preferably extend axially from tool drive fitting 410, exiting from tool drive fitting 410 preferably via an aperture defining the opening for the central passageway through which the guide wire extends when the apparatus of FIGS. 5 through 7 is used in a surgical environment.

A tool bit 450 which is adapted for use with drive shaft assembly 413 and specifically with tool drive fitting 410 preferably includes a female mating portion shaped for complemental contact and interlocking engagement with the male jigsaw puzzle piece shape of male tool bit interface 461. An annular recess is formed within female tool bit interface surface 460 by making an axial bore. This axial bore is preferably of diameter slightly less than the minimum cross-sectional dimension of the neck portion of male tool bit interface surface 461 corresponding to neck portion 374 in FIG. 3. As a result, the axial bore in small tool bit interface 460 provides an annular recess for detenting action whereby when small tool bit 450 is assembled over tool drive fitting 410, as illustrated generally in FIG. 6 and specifically in FIG. 7, axially extending radially superelastically reactively flexing tongues 436 flex radially inwardly and resultantly spring radially outwardly, due to their superelastic characteristic resulting from the radially inward flexure, contacting the annular surface of the axial bore as illustrated in FIG. 7 thereby retaining small tool bit 450 in mating engagement with tool drive fitting 410.

The coupling apparatus of the invention is preferably designed so that resulting stresses and flexures of the superelastic material parts are always within the envelope of superelastic behavior. As a result, there is no fatigue or wear-out problem with the coupling apparatus of the invention. Additionally, the nickel-titanium superelastic alloys which are preferred for Use in this invention are very hard—much harder than stainless steels, from which surgical cutting tool bits of the type to be typically used with this invention are made. Hence, over time the tool bits, which wear as a result of use, additionally wear at the locations of contact with the superelastic alloy parts, while the superelastic parts, being harder than stainless steel, do not wear at such areas of contact. As a result, the coupling apparatus according to the invention should exhibit nearly infinite life.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A torque-transmitting coupling assembly comprising:
a tubular member made of super-elastic alloy, defining a passageway extending along a first axis;
a fitting member separate from the tubular member, defining a shape presenting a first mating interface surface; and
a tool-bit member having a second axis and presenting a second mating interface surface adapted for receptive complemental facing with the first mating interface surface,
whereupon relative motion between the fitting and tool-bit wedges the first and second mating interface surfaces sideways into juxtaposition, with the first and second axes aligned with one another.

2. The assembly of claim 1 further comprising a tongue member made of super-elastic alloy, whereupon the relative motion activates the super-elastic alloy of the tongue, allowing the mating interface surfaces to be held in juxtaposition with one another.

3. The assembly of claim 2 further comprising a recess formed in the tool-bit, wherein the tongue detentively snaps into the recess to align the first and second axes with one another.

4. The assembly of claim 2 wherein the tongue is an integral part of the tubular member.

5. The assembly of claim 2 wherein the tongue extends axially from an end of the fitting member and into the tool-bit.

6. The assembly of claim 2 wherein the tongue protrudes into a recess formed within the second mating interface surface to provide detenting attachment of the tool bit to the tubular member.

7. The assembly of claim 1 wherein the first and second mating interface surfaces are correspondingly curved.

8. A torque-transmitting coupling assembly comprising:
a tubular member made of super-elastic alloy, defining a passageway extending alone a first axis;
a fitting member defining a shape presenting a first mating interface surface; and
a tool-bit member having a second axis and presenting a second mating interface surface adapted for receptive complemental facing with the first mating interface surface,
a tongue member made of super-elastic alloy, whereupon the relative motion activates the super-elastic alloy of the tongue, allowing the mating interface surfaces to be held in juxtaposition with one another,
whereupon relative motion between the fitting and tool-bit slides the first and second mating interface surfaces sideways into juxtaposition, with the first and second axes aligned with one another, and
wherein the fitting has an aperture opening onto the first mating interface surface and the tongue projects through the aperture.

9. A torque-transmitting coupling assembly comprising:
a tubular member made of super-elastic alloy, defining a passageway extending along a first axis;
a fitting member defining a shape presenting a first mating interface surface; and
a tool-bit member having a second axis and presenting a second mating interface surface adapted for receptive complemental facing with the first mating interface surface,
whereupon relative motion between the fitting and tool-bit slides the first and second mating interface surfaces sideways into juxtaposition, with the first and second axes aligned with one another,
the fitting member further comprising a male part extending axially therefrom that defines a jig-saw shape presenting the first mating interface surface and wherein the tool-bit defines a female jigsaw shape presenting the second mating interface surface including a recess formed therein.

10. A torque-transmitting coupling assembly comprising:
a tubular member made of super-elastic alloy, defining a passageway extending along a first axis;
a fitting member defining a shape presenting a first mating interface surface; and
a tool-bit member having a second axis and presenting a second mating interface surface adapted for receptive complemental facing with the first mating interface surface,
whereupon relative motion between the fitting and tool-bit slides the first and second mating interface surfaces sideways into juxtaposition, with the first and second axes aligned with one another, and
further comprising a radially flexing collet that connects the fitting to the tubular member.

11. A surgical instrument having a torque-transmitting coupling assembly and comprising:
a tubular member made of super-elastic alloy with a driven and a driving end having an integral tongue member, defining a passageway extending along a first axis;
a fitting member separate from the tubular member, defining a shape presenting a first mating interface surface; and
a tool-bit member having a second axis and presenting a second mating interface surface adapted for receptive complemental facing with the first mating interface surface, including a recess formed in the second mating interface surface,
whereupon relative motion activates the super-elastic alloy of the tongue, which detentively snaps into the recess to align the first and second axes with one another.

12. The instrument of claim 11 wherein the fitting has an aperture opening onto the first mating interface surface and the tongue projects through the aperture.

13. The instrument of claim 11 wherein the tongue extends axially from an end of the fitting member and into the tool-bit.

14. A surgical instrument having a torque-transmitting coupling assembly and comprising:
a tubular member made of super-elastic alloy with a driven and a driving end having an integral tongue member, defining a passageway extending along a first axis;
a fitting member defining a shape presenting a first mating interface surface; and
a tool-bit member having a second axis and presenting a second mating interface surface adapted for receptive complemental facing with the first mating interface surface, including a recess formed in the second mating interface surface, whereupon relative motion activates the super-elastic alloy of the tongue, which detentively snaps into the recess to align the first and second axes with one another, the fitting member further comprising a male part extending axially therefrom that defines a jig-saw shape presenting the first mating interface surface and wherein the tool-bit defines a female jigsaw shape presenting the second mating interface surface.

15. A surgical instrument having a torque-transmitting coupling assembly and comprising:

a tubular member made of super-elastic alloy with a driven and a driving end having an integral tongue member, defining a passageway extending along a first axis;

a fitting member defining a shape presenting a first mating interface surface; and a tool-bit member having a second axis and presenting a second mating interface surface adapted for receptive complemental facing with the first mating interface surface, including a recess formed in the second mating interface surface, whereupon relative motion activates the super-elastic alloy of the tongue, which detentively snaps into the recess to align the first and second axes with one another, the passageway extending from an axially open center of the tubular member and opening onto the first mating interface surface, wherein the recess aligns concentrically with the passageway when the tool bit and the tubular member are slid sideways relative to one another so that the first and second mating interface surfaces are juxtaposed.

16. A flexible surgical reamer having a torque-transmitting coupling assembly and comprising:

a tubular member made of super-elastic alloy with a driven end and a driving end having an integral tongue member, defining a passageway extending along a first axis;

a fitting member defining a shape presenting a first mating interface surface including an aperture opening onto the first mating interface surface, with the tongue projecting through the aperture; and a tool-bit member having a second axis and presenting a second mating interface surface adapted for receptive complemental facing with the first mating interface surface, including a recess formed in the second mating interface surface, whereupon relative motion activates the super-elastic alloy of the tongue, which detentively snaps into the recess to align the first and second axes with one another.

17. The reamer of claim 16 further comprising another torque-transmitting coupling assembly, including a drive fitting and a radially flexing collet that connects the driven end to the drive fitting.

* * * * *